(12) United States Patent
Shams et al.

(10) Patent No.: US 10,928,549 B2
(45) Date of Patent: Feb. 23, 2021

(54) HIGH ALTITUDE UAV FOR MONITORING METEOROLOGICAL PARAMETERS

(71) Applicant: UNITED STATES OF AMERICA AS REPRESENTED BY THE ADMINISTRATOR OF NASA, Washington, DC (US)

(72) Inventors: Qamar A. Shams, Yorktown, VA (US); Neil C. Coffey, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 117 days.

(21) Appl. No.: 16/192,205

(22) Filed: Nov. 15, 2018

(65) Prior Publication Data
US 2019/0154874 A1    May 23, 2019

Related U.S. Application Data

(60) Provisional application No. 62/589,003, filed on Nov. 21, 2017.

(51) Int. Cl.
*G01W 1/08* (2006.01)
*B64C 3/54* (2006.01)
(Continued)

(52) U.S. Cl.
CPC ............. *G01W 1/08* (2013.01); *B64C 1/0009* (2013.01); *B64C 3/54* (2013.01); *B64C 39/024* (2013.01);
(Continued)

(58) Field of Classification Search
CPC ........... G01W 1/14; G01W 1/00; G01W 1/08; G01W 1/02; G01W 1/10; G01W 1/04;
(Continued)

(56) References Cited

U.S. PATENT DOCUMENTS

| 7,394,723 | B2 * | 7/2008 | Rubin | G01W 1/10 367/13 |
|---|---|---|---|---|
| 8,401,217 | B2 | 3/2013 | Shams | |
| 9,591,417 | B2 | 3/2017 | Shams | |
| 9,620,025 | B2 | 4/2017 | Shams | |
| 9,867,591 | B2 | 1/2018 | Shams | |

(Continued)

FOREIGN PATENT DOCUMENTS

| CN | 105911582 | 8/2016 | |
|---|---|---|---|
| WO | WO-2008051288 A3 * | 10/2008 | ............... G01W 1/04 |

*Primary Examiner* — Andre J Allen
(74) *Attorney, Agent, or Firm* — M. Bruce Harper; Robin W. Edwards; Helen M. Galus

(57) ABSTRACT

Various embodiments may provide an airborne system for measuring meteorological parameters, including a high altitude unmanned aerial vehicle (UAV) formed completely or partially of closed-cell polyurethane foam. In various embodiments, the UAV may include extendable wings configured to extend and retract as the UAV climbs and descends to different altitude levels. In various embodiments, the UAV may include one or more infrasonic sensors and wind screening configured to measure one or more meteorological parameters, such as wind shear, seismic waves, magnetic storms, magnetohydrodynamic waves, severe weather, tornadoes, hurricanes, meteors, and lighting. The infrasonic sensors may be configured to determine wind shear at the local and regional level. In various embodiments, other meteorological sensors may also be included in/on the UAV in addition to the infrasonic sensors.

20 Claims, 9 Drawing Sheets

(51) Int. Cl.
*B64C 39/02* (2006.01)
*B64C 1/00* (2006.01)
(52) U.S. Cl.
CPC ............... *B64C 2001/0072* (2013.01); *B64C 2201/125* (2013.01)
(58) Field of Classification Search
CPC ........... G01W 1/06; G01W 1/12; G01W 1/16; G01W 2001/003; G01W 2001/006; G01W 2203/00; B64C 1/0009; B64C 2001/0072; B64C 2201/102; B64C 2201/125; B64C 39/024; B64C 3/54
USPC .......................................... 73/170.16–170.28
See application file for complete search history.

(56) References Cited

U.S. PATENT DOCUMENTS

| | | | |
|---|---|---|---|
| 10,365,089 B1 * | 7/2019 | Titovich | G01V 1/18 |
| 10,578,440 B1 * | 3/2020 | Titovich | G05D 1/101 |
| 2011/0098950 A1 | 4/2011 | Carr | |
| 2015/0131084 A1 * | 5/2015 | Fucile | G01N 29/46 356/72 |
| 2017/0220046 A1 * | 8/2017 | Tsai | B64C 39/024 |
| 2017/0334576 A1 | 11/2017 | Shams | |
| 2018/0009545 A1 * | 1/2018 | Black, Jr. | B64C 39/024 |
| 2018/0074519 A1 * | 3/2018 | Qin | B64C 39/024 |
| 2018/0210065 A1 | 7/2018 | Shams | |
| 2018/0244386 A1 * | 8/2018 | Phan | G01W 1/08 |

* cited by examiner

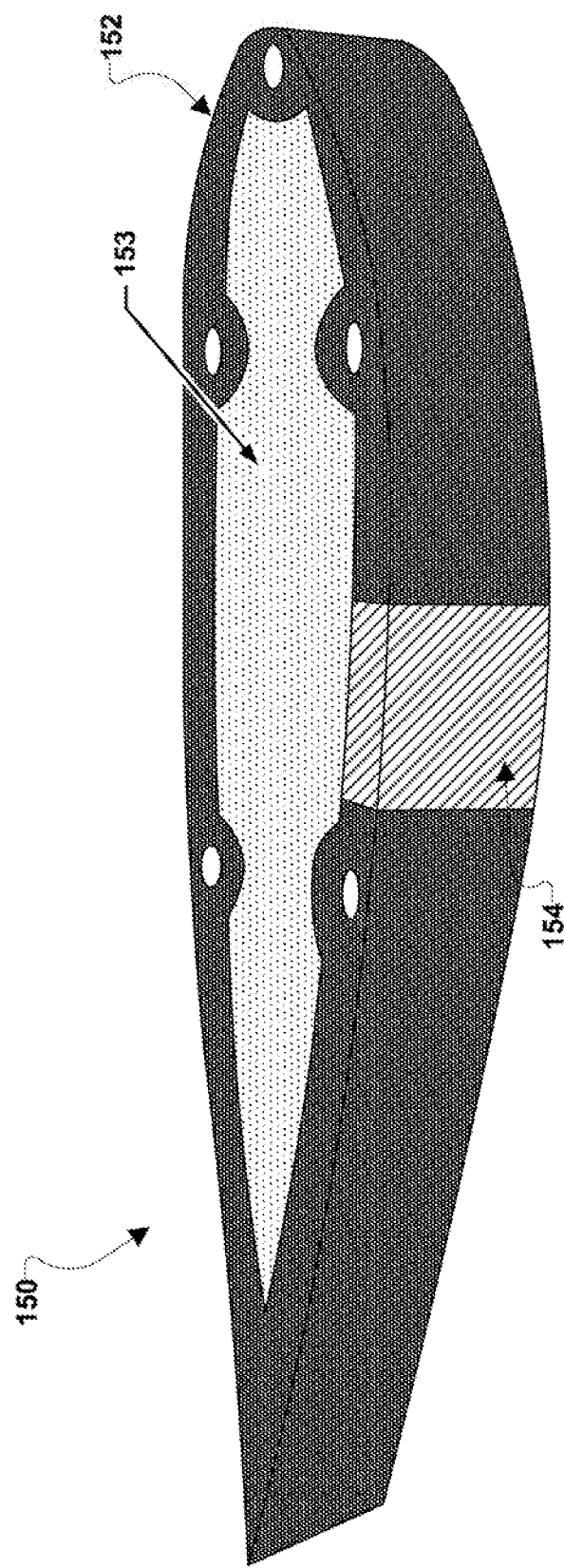

HIGH ALTITUDE UAV FOR MONITORING METEOROLOGICAL PARAMETERS

CROSS-REFERENCE TO RELATED PATENT APPLICATIONS

This patent application claims the benefit of and priority to U.S. Provisional Patent Application No. 62/589,003, filed on Nov. 21, 2017, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Meteorology events can be microscale or macroscale events. Microscale events are events approximately 1 km in size. Macroscale events are events spread between 10 to 1000 km in size. Some meteorology events may be extreme weather phenomena, such as convective storms, tornadoes, shear-induced turbulence, microbursts, acoustic gravity waves, and hurricanes. Meteorology events are influenced by many factors. The jet stream plays a vital role in extreme weather phenomena. The jet stream is narrow bands of fast moving air around the Earth. Winds also play a critical role in shifting weather patterns. The winds are responsible for feeding moisture that rises over the mountains resulting in an abundance of rain and snow. A difference in pressure that results in speeds of the jet stream or ferocious winds of a tornado, or descent of a microburst. Horizontal pressure gradient causes the wind to blow. Due to pressure differences, when air is forced to ascend, it expands and cools resulting in condensation, hence clouds. In addition to wind, water is another basis for nearly all of Earth's extreme weather. Additionally, weather exists in all three phases in Earth's atmosphere (i.e., gas (water vapor), liquid (rain), and solid (ice)). The change in water phase consumes the energy which fuels weather on Earth. Wind shear is another key ingredient that can take an ordinary thunderstorm to its severe limits and may be a key factor contributing to the severity of the storms. For example, ordinary storms do not last for more than an hour or so. In these storms, the updraft and downdraft are often spaced closely, so the downdraft is blocked with an updraft and the storm dissipates quickly. To reach its severe limits, the storm needs more time to develop.

As meteorology events are influenced by so many factors, for accurate local or regional weather forecasts, many areas in the local or regional space need to be scanned for various measurements including, temperature, humidity, pressure, altitude, wind speed, wind direction, and wind shear. Obtaining all these measurements in the local or regional area may be difficult.

Current methods to forecast near term weather phenomenon include electromagnetic based radar and data from radiosondes. Radiosondes and radar have certain limitations and do not provide all required information for accurate weather forecast. Radar is an active remote sensor which has limited range and sometimes radar beams overshoot the mesocyclonic circulation limiting radar's effectiveness. There is also a possibility that mesocyclonic circulation cannot be detected when above a radar set because the conal region immediately above the radar set may be an area from which radar returns may not be received. Radiosondes are launched twice a day from different locations of the world and meteorological data is collected to generate Stüve diagrams to predict weather instability and to determine convective available potential energy (CAPE) values. Radiosondes are not re-usable and used only at pre-determined locations around the globe. Additionally, radiosondes are disposable and do not provide all required information for accurate weather forecasts. As examples, radiosondes do not provide tornadoes or microburst information at infancy of the event and radiosondes do not provide wind shear information over a wide range area. Further, there are several shortcomings to using radiosondes for tracking storms around the clock, two of which are: 1) that the radiosondes do not have capability to measure wind shear; and 2) that the radiosondes are launched at particular locations around the globe after every 12 hours (giving the radiosondes limited capacity and tracking).

In light of these and other drawbacks to current methods to forecast near term weather phenomenon, there is a need for an advanced airborne meteorological system which can provide meteorological parameters at any location at any desired time. There is need of a system that can scan local and regional areas from ground to high altitude each hour or as needed

BRIEF SUMMARY OF THE INVENTION

Various embodiments may provide an advanced meteorological system, such as an advanced airborne meteorological system, that can provide meteorological parameters at any location at any desired time. Various embodiments may provide systems that may scan local and regional areas from ground to high altitude each hour or as needed. Various embodiments may provide methods and systems that measure accurately all key ingredients/parameters that contribute to producing severe storms (including severe thunderstorms, tornadoes, and microbursts). Various embodiments may provide methods and systems for using monitoring devices, such as unmanned aerial vehicles (UAV), backpack carried devices, or any other type form factor device, to determine directions and/or altitudes of infrasonic sources.

Various embodiments may provide an airborne system for measuring meteorological parameters, including a high altitude UAV formed completely or partially of closed-cell polyurethane foam. In another embodiment, UAV may be formed by using Nylon, Carbon, and Kevlar fiber matrix for high structural strength and to provide flexible/springy characteristics. The wings may be fixed or extendable. In various embodiments, the UAV may include extendable wings configured to extend and retract as the UAV climbs and descends to different altitude levels. The extendable wings may be controlled by actuators triggered at pre-determined altitude levels to extend/retract the wings. In various embodiments, the altitude levels may be measured by absolute pressure sensors included on/in the UAV. In various embodiments, the UAV may include one or more infrasonic sensors and wind screening configured to measure one or more meteorological parameters, such as wind shear, seismic waves, magnetic storms, magnetohydrodynamic waves, severe weather, tornadoes, hurricanes, meteors, and lighting. The infrasonic sensors may be configured to determine wind shear at the local and regional level. In various embodiments, other meteorological sensors may also be included in/on the UAV in addition to the infrasonic sensors. In various embodiments, the airborne system may be used in towns and cities to track drones and UAVs in the area.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 1E is a block diagram of a cross section of a wing section according to an embodiment;

DETAILED DESCRIPTION OF THE INVENTION

Figure 1A:
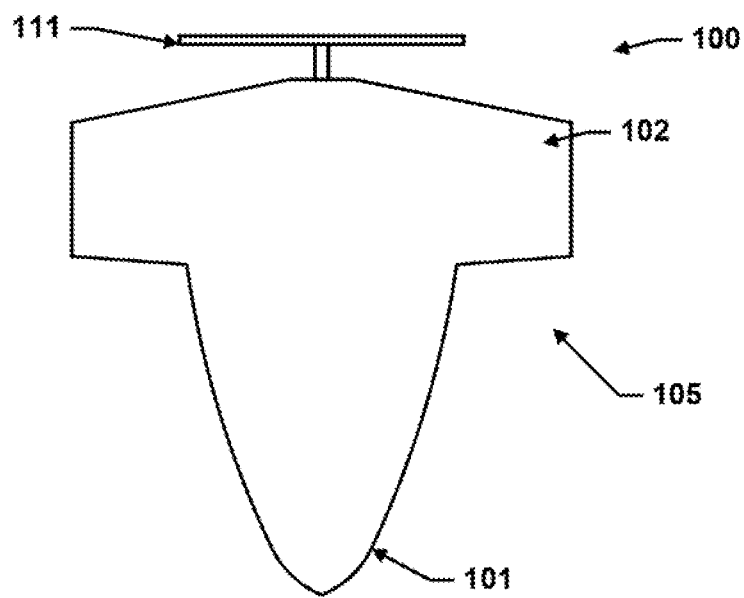
FIG. 1A is a block diagram of a high altitude unmanned aerial vehicle (UAV) according to various embodiments with the extendable wings in a retracted position.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the term "computing device" refers to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players, smart televisions, digital video recorders (DVRs), and similar electronic devices which include a programmable processor and memory and circuitry for performing the operations described herein.

Acoustical studies of atmospheric events like convective storms, tornadoes, shear-induced turbulence, microbursts, acoustic gravity waves, and hurricanes over the last fifty years have established that these events are strong emitters of infrasound. Measurement of environmental turbulence and wind shear including vortex are important factors for forecasting local and regional weather. The various natural sources of infrasonic energy in the atmosphere have been explored since 1940s. It has been suggested that there are three ranges of eddy sizes in a turbulent system. First, energy is supplied to the turbulence by the generation of very large eddies, generated in the free atmosphere by wind shear action. Second, the large eddies decay and smaller eddies are generated followed by third, even smaller eddies. A small portion of turbulent energy is converted into low frequency acoustic energy (infrasound) which can be detected at ranges of many miles from the source. The shape of the acoustic power spectrum can be used to identify type of turbulence in the atmosphere. For example, the calculated acoustic power radiated by the largest eddies is proportional to the fourth of the frequency, for the inertial subrange falls off as the 7/2 power of frequency, and for the third range, most of the energy is dissipated in heat. As another example, microbaroms propagate horizontally from large bodies of water and pressure of 1-2 dynes/cm$^2$ may be typical with pressure of 6 dynes/cm$^2$ indicating storms off the Atlantic coast. Acoustic energy (infrasound) can also be used to detect and measure seismic waves. Seismic events of magnitude 5 and larger couple detectable amounts of acoustic energy into the atmosphere. Infrasonic microphones respond to seismic activity resulting in an electrical signal at the microphone itself. It may be possible to distinguish between seismic and acoustic signals as detectable with infrasonic microphones. The seismically caused signals will be at least an order of magnitude faster than an acoustic wave that has propagated from a distance. Acoustic energy (infrasound) can also be used to detect and measure magnetic storms. During solar flares, radiation particles travel along curved paths at speeds of 1000 to 3000 km/sec and reach Earth's ionosphere about 1.5 days later and produce plasma clouds that may be detectable with infrasonic microphones. Acoustic energy (infrasound) can also be used to detect and measure magneto hydrodynamics. Waves are generated by the interaction of the storms with plasma. Some of the energy in these waves is converted to infrasound by the outer atmosphere and propagates to the Earth. Frequencies of 0.005 to 0.05 Hz and acoustic pressure of 2 to 7 dynes/cm$^2$ have been reported and the signal usually persists for at least several hours. Acoustic energy (infrasound) can also be used to detect and measure hurricanes, tornados, meteors, and lightning. Hurricanes, tornados, meteors, and lightning bolts generate acoustic energy, some of which is in the infrasonic range. The signal from meteors and lightning bolts, which begin as shock waves, are comparatively brief. The signals from hurricanes and tornadoes may persist from a half-hour to several hours.

Various natural sources of infrasonic energy exist in the atmosphere. If recorded, these infrasonic energy bands can provide useful information for tracking several natural and man-made events. Some of the natural events which can be tracked by using on-board infrasonic sensors are tracking clear air turbulence, tracking tornados at very early stages, tracking microbursts at very early stage, tracking thermals in the atmosphere, tracking severe weather, tracking hurricanes, and tracking solar flare activities. Similarly, infrasonic signals can be used to track the core of the jet stream to save fuel and reducing carbon emissions in the atmosphere.

Various embodiments, leverage infrasonic sensors to measure and track various meteorological parameters and events, such as wind shear, seismic waves, magnetic storms, magnetohydrodynamic waves, severe weather, tornadoes, hurricanes, meteors, and lighting.

Various embodiments may provide an advanced meteorological system, such as an advanced airborne meteorological system, that can provide meteorological parameters at any location at any desired time. Various embodiments may provide systems that may scan local and regional areas from ground to high altitude each hour or as needed. Various embodiments may provide methods and systems that measure accurately all key ingredients/parameters that contribute to producing severe storms (including severe thunderstorms, tornadoes, and microbursts). Various embodiments may provide methods and systems for using monitoring devices, such as unmanned aerial vehicles (UAV), backpack carried devices, or any other type form factor device, to determine directions and/or altitudes of infrasonic sources.

Various embodiments may provide an airborne system for measuring meteorological parameters, including a high altitude UAV formed completely or partially of closed-cell polyurethane foam. In another embodiment, UAV may be formed by using Nylon, Carbon, and para-aramid synthetic (e.g., Kevlar) fiber matrix for high structural strength and to provide flexible/springy characteristics. To make the UAV lightweight, the inner section of the UAV may be filled with aerogel material. The wings may be fixed or extendable. In various embodiments, the UAV may include extendable wings configured to extend and retract as the UAV climbs and descends to different altitude levels. The extendable wings may be controlled by actuators triggered at predetermined altitude levels to extend/retract the wings. In various embodiments, the altitude levels may be measured by absolute pressure sensors included on/in the UAV. In various embodiments, the UAV may include one or more infrasonic sensors and wind screening configured to measure one or more meteorological parameters, such as wind shear, seismic waves, magnetic storms, magnetohydrodynamic waves, severe weather, tornadoes, hurricanes, meteors, and lighting. The infrasonic sensors may be configured to determine wind shear at the local and regional level. In various embodiments, other meteorological (i.e., weather related) sensors may also be included in/on the UAV in addition to the infrasonic sensors. In various embodiments, the airborne system may be used in towns and cities to track drones and UAVs in the area. In various embodiments, the UAV may include two types of sensors, flight control sensors and sensors to acquire atmospheric/weather related parameters.

In various embodiments, the meteorological system, such as the airborne meteorological system, may include a base/control station. In various embodiments, the monitoring device, such as a UAV, backpack carried device, etc., may be configured to arrive at a base/control station without losing any collected data or sensors. In various embodiments, the monitoring device, such as a UAV, backpack carried device, etc., may be configured to store and process all meteorological parameters in real time. In various embodiments, the monitoring device, such as a UAV, backpack carried device, etc., may be configured to transmit selected data to the base/control station in real time. In various embodiments, the monitoring device, such as a UAV, backpack carried device, etc., may include device control sensors (e.g., flight control sensors, etc.) and weather forecast sensors including sensors to measure severe weather, microbursts, and tornadoes. In various embodiments, the monitoring device, such as a UAV, backpack carried device, etc., may include communication and data transmission hardware, such as modems, antennas, transceivers, etc., configured to enable the monitoring device, such as a UAV, backpack carried device, etc., to send/receive data. For example, the monitoring device, such as a UAV, backpack carried device, etc., may send/receive data to/from the base/control station. In various embodiments, the monitoring device, such as a UAV, backpack carried device, etc., may be configured to travel (e.g., fly, drive, be carried, etc.) from and return to the base/control station within an hour or sooner.

In various embodiments, the monitoring device, such as a UAV, backpack carried device, etc., may include electronics, such as a microprocessor, for calculating Stüve diagrams by using on-board embedded software. The Stüve diagram may determine instability of the atmosphere. In a Stüve diagram, temperature may be plotted along the X-axis and the pressure in millibar may be plotted along the Y-axis. Along Y-axis, altitude may also be plotted in kilometers. Using Stüve diagrams, the monitoring device's on-board microprocessor, such as a UAV's on-board microprocessor, backpack carried device's on-board microprocessor, etc.) on-board microprocessor may calculate and determine instability of the atmosphere.

Various embodiments may provide for measurement of one or more weather related parameters. In various embodiments, the monitoring device, such as a UAV, backpack carried device, etc., may include sensors configured to measure one or more weather parameters critical for weather forecasting, such as barometric pressure, air temperature, relative humidity, dew point, wind chill temperature, wind speed, and wind direction. In various embodiments, one or more ultrasonic based transducer system may record one or more of the weather parameters. Using on-board Global Position System (GPS) data, true wind speed and direction may be calculated in various embodiments. In various embodiments, the monitoring device, such as a UAV, backpack carried device, etc., may include four transducers which may operate in pairs. In some embodiments, one transducer of a pair may inject a pulse into the air, and the other transducer of the pair may listen for the arrival of the pulse. The data may be fed into a microprocessor which combines the recorded data from all transducers to calculate the resultant wind speed. In various embodiments, the monitoring device, such as a UAV, backpack carried device, etc., may include one or more weather related sensors in addition to ultrasonic transducers. As examples, the one or more weather related sensors may be any or all of barometric pressure sensors, altitude sensors, temperature sensors, relative humidity measurement sensors, wind speed sensors, wind direction sensors, and/or wind shear measurement sensors. The infrasonic sensors may be pressure or acceleration compensated.

Figure 1B:
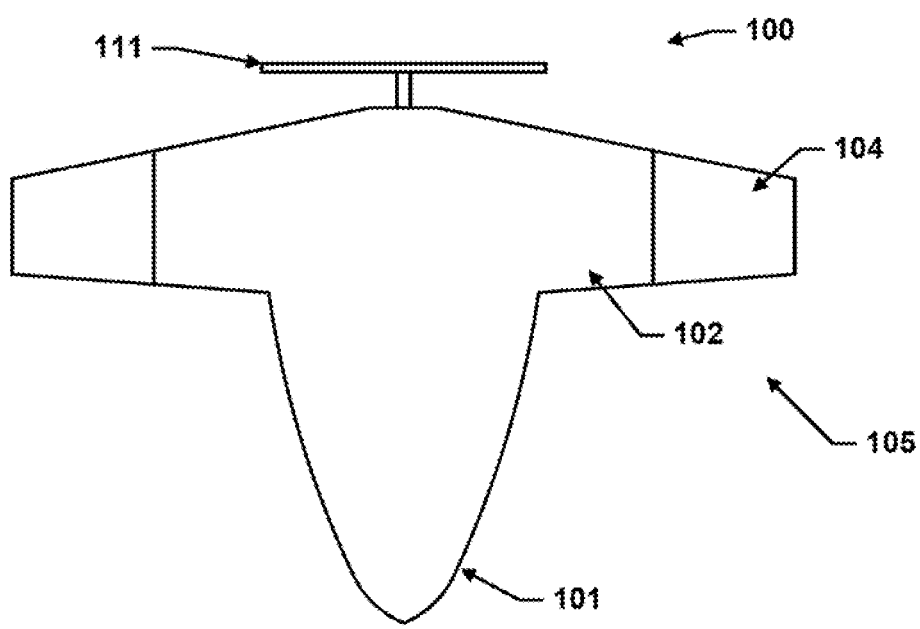
FIG. 1B is a block diagram of the UAV of FIG. 1A according to various embodiments with the extendable wings in a first extended position.
Figure 1C:
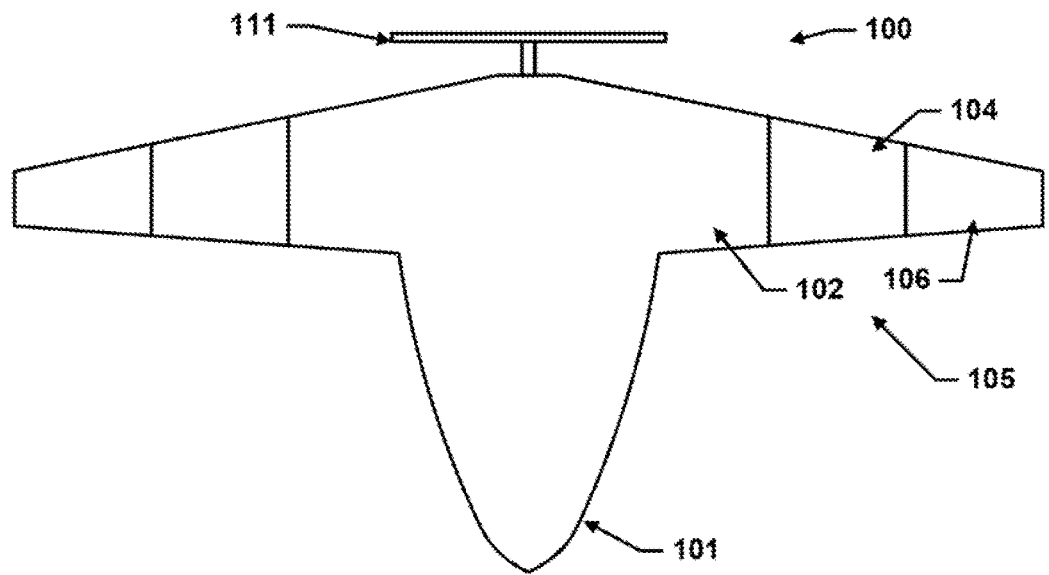
FIG. 1C is a block diagram of the UAV of FIG. 1A according to various embodiments with the extendable wings in a second extended position.
Figure 1D:
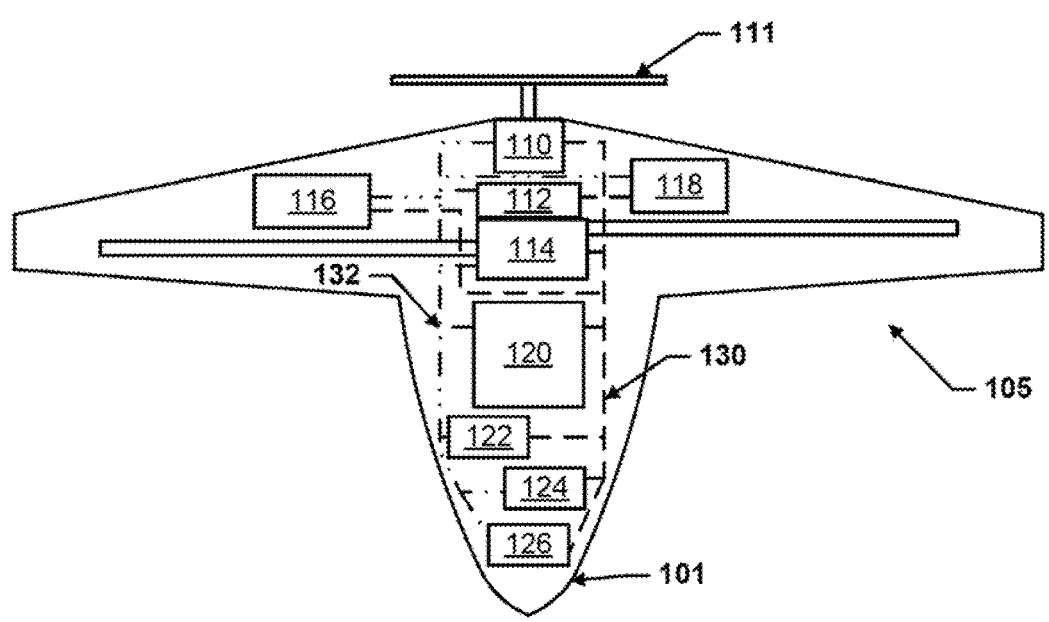
FIG. 1D is a component block diagram of the UAV of FIG. 1A according to various embodiments.

FIGS. 1A-1D illustrate various aspects of an embodiment monitoring device, such as a high altitude UAV 100. FIG. 1A illustrates the UAV 100 with the extendable wings 105 in a retracted position, FIG. 1B illustrates the UAV 100 with the extendable wings 105 in a first extended position (i.e., semi-extended), and FIG. 1C illustrates the UAV 100 with the extendable wings 105 in a second extend position (i.e., fully extended). FIG. 1D illustrates internal components of the UAV 100 according to various embodiments. In another embodiment, UAV 100 may be formed by using Nylon, Carbon, and para-aramid synthetic (e.g., Kevlar) fiber matrix and filled with aerogel material for high structural strength and to provide flexible/springy characteristics. The wings may be fixed or extendable. The UAV may be formed by using Nylon, Carbon, and para-aramid synthetic (e.g., Kevlar) fiber matrix for high structural strength and flexibility.

With reference to FIGS. 1A-1D, in various embodiments the UAV 100 may be a component of an airborne system for measuring meteorological parameters. The UAV 100 may be a high altitude UAV 100 formed completely or partially of closed-cell polyurethane foam. The UAV 100 may include a fuselage 101 and extendable wings 105 extending from the fuselage 101. The UAV 100 may include a propulsion unit, such as a propeller 111 configured to provide thrust for the UAV 100. While illustrated as a propeller 111, other type propulsion units, such as jet engines, ramjet, turbo-props, rockets, etc., may be substituted in the various embodiments for the propeller.

In various embodiments, the extendable wings 105 may be configured to extend and retract as the UAV 100 climbs and descends to different altitude levels. The extendable wings 105 may be controlled by one or more actuators 114 triggered at pre-determined altitude levels to extend/retract the wings 105. In various embodiments, the altitude levels may be measured by absolute pressure sensors included on/in the UAV 100. A first stage 102 of each extendable wing 105 may be always extended from the fuselage 101 of the UAV 100. FIG. 1A shows the extendable wings 105 in a first stage of extension with only the first stage 102 of the wing 105 extended. This configuration with only the first stage 102 extended may be suitable for low altitude flight and only the first stage 102 may provide lift for the UAV 100 in the fully retracted configuration illustrated in FIG. 1A. In response to the UAV 100 climbing to or above a first set altitude threshold or level, the UAV 100 may transition to a semi-extended position as shown in FIG. 1B with second stages 104 of the wings 105 extended away from the fuselage 101 outboard of the first stage 102 of the wings 105. The altitude of the UAV 100 relative to the first altitude threshold or level may be measured by absolute pressure sensors included on/in the UAV 100 and a microprocessor of an avionics controller module (ACM) 120 may trigger extension of the second stage 104 via control of one or more actuators 114 when the UAV 100 is determined to be at or above the first altitude threshold or level. In a similar manner, when the UAV 100 is determined by the microprocessor of the ACM 120 to have flown below the first altitude threshold or level, the ACM 120 may trigger retraction of the second stage 104 via control of one or more actuators 114 returning the UAV 100 to the fully retracted position as shown in FIG. 1A. In response to the UAV 100 climbing to or above a second set altitude threshold or level (e.g., an altitude threshold or level), the UAV 100 may transition to a fully-extended position as shown in FIG. 1C with third stages 106 of the wings 105 extended away from the fuselage 101 outboard of the first stages 102 and the second stages 104 of the wings 105. The altitude of the UAV 100 relative to the second altitude threshold or level may be measured by absolute pressure sensors included on/in the UAV 100 and a microprocessor of the ACM 120 may trigger extension of the third stage 106 via control of one or more actuators 114 when the UAV 100 is determined to be at or above the second altitude threshold or level. In a similar manner, when the UAV 100 is determined by the microprocessor of the ACM 120 to have flown below the second altitude threshold or level, the ACM 120 may trigger retraction of the third stage 106 via control of one or more actuators 114 returning the UAV 100 to the semi-extended position as shown in FIG. 1B.

In various embodiments, the UAV 100 may include various components such as one or more ACM 120, one or more power plant 110, one or more suites of infrasonic sensors 116, one or more suites of weather related sensors 118, one or more actuators 114, one or more navigation units 122, one or more power supplies 112, one or more flight computers 126, and one or more communication and data transmission hardware packages 124 illustrated in FIG. 1D. Additionally, the UAV 100 may include other flight sensors and flight control actuators (not shown) connected to the one or more flight computers 126 to enable the UAV 100 to fly autonomously. In various embodiments, the one or more ACM 120, one or more power plant 110, one or more suites of infrasonic sensors 116, one or more suites of weather related sensors 118, one or more actuators 114, one or more navigation units 122, one or more power supplies 112, one or more flight computers 126, and one or more communication and data transmission hardware packages 124 may be connected together by power and/or communications buses. Via these connections data and/or power may be exchanged between the various components on board the UAV 100 (e.g., ACM 120, power plant 110, suites of infrasonic and/or ultrasonic sensors 116, suites of weather related sensors 118, actuators 114, navigation units 122, power supplies 112, flight computers 126, communication and data transmission hardware packages 124, etc.). In various embodiments, the power plant 110 may be any type power plant configured to drive the propulsion unit, such as propeller 111. For example, the power plant 110 may be an electric motor. In various embodiments, the power supplies 112 may be any type power supplies configured to provide power to the various components. For example, the power supplies 112 may be batteries. In various embodiments, the flight computers 126 may control the flight of the UAV 100 in response to instructions from the ACM 120. For example, the ACM 120 may indicate to the flight computers 126 a flight path, altitude, heading, speed, etc., selected to enable the UAV 100 to gather weather measurements. Additionally, the flight computers 126 may control the UAV 100 to fly from and return to a base/control station. In some embodiments, the round-trip time (i.e., flight time) from the base/control station to the measurement altitude and back may be within an hour or less. Additionally, the flight computers 126 and/or ACM 120 may be connected to the actuators 114 to control the operations of the actuators 114 to extend/retract the wings 105. The actuators 114 may be any type actuators 114, such as servo motors, etc.

In various embodiments, the suites of infrasonic and/or ultrasonic sensors 116 may be one or more infrasonic sensors, such as infrasonic microphones, recording infrasonic measurements. The suite of infrasonic and/or ultrasonic sensors 116 may include infrasonic sensors configured to measure one or more meteorological parameters, such as wind shear, seismic waves, magnetic storms, magnetohydrodynamic waves, severe weather, tornadoes, hurricanes, meteors, and lighting. The suites of infrasonic and/or ultrasonic sensors 116 may be one or more ultrasonic sensors, such as ultrasonic microphones, recording ultrasonic measurements. The suite of infrasonic and/or ultrasonic sensors 116 may include combinations of both one or more ultrasonic sensors and one or more infrasonic sensors. The ultrasonic sensors may be configured to determine wind speed at the local level. In some embodiments, the suite of infrasonic and/or ultrasonic sensors 116 may include pairs of ultrasonic transducers and one transducer of a pair may inject a pulse into the air, and the other transducer of the pair may listen for the arrival of the pulse. The data from the suites of infrasonic and/or ultrasonic sensors 116 may be fed to the ACM 120 which may combine the recorded data from all transducers to calculate the resultant wind speed.

In various embodiments, the one or more suites of weather related sensors 118 may include various sensors configured to measure one or more weather parameters critical for weather forecasting, such as barometric pressure, air temperature, relative humidity, dew point, wind chill temperature, wind speed, and wind direction. For example, the one or more suites of weather related sensors 118 may include any or all of barometric pressure sensors, altitude sensors, temperature sensors, relative humidity measurement sensors, wind speed sensors, wind direction sensors, and/or wind shear measurement sensors. In various embodiments, one or more suites of weather related sensors 118 may also include ultrasonic based transducer systems that may be configured to record one or more of the weather parameters. The data from the suites of weather related sensors 118 may be fed to the ACM 120. In various embodiments, the navigation units 122 may be any type of navigation sensors or systems configured to output the UAV 100's position and/or speed data, such as GPS units. The navigation units 122 may output the data to the ACM 120, and using the navigation data true wind speed and direction may be calculated in various embodiments.

In various embodiments, the communication and data transmission hardware packages 124 may be such as modems, antennas, transceivers, etc., configured to enable the UAV 100 to send/receive data. For example, the UAV 100 may send/receive data to/from a base/control station via the communication and data transmission hardware packages 124. The communication and data transmission hardware packages 124 may enable the UAV 100 to establish one or more wireless data links with the base/control station and the wireless data links may be used to exchange data between the UAV 100 and base/control station. In this manner, via the wireless data links a user's computing device connected to the base/control station may receive real-time data gathered by the UAV 100 while in flight.

FIG. 1E is a block diagram of a cross section of a wing section 150 according to an embodiment. The wing section 150 may be a section of an extendable wing, such as extendable wing 105 described with reference to FIGS. 1A-1D above, or may be a section of a fixed wing length wing. With reference to FIGS. 1A-1E, the wing section 150 illustrates that the wing is formed from a continuous surface 152 configured to form an empty space 153 therein. The surface 152 may be made using one or more different materials in combination, such as a foam (e.g., closed cell polyurethane foam) in combination with a fiber matrix, such as nylon, carbon, and/or para-aramid synthetic (e.g., Kevlar) fiber matrixes. In various embodiments, the empty space 153 may be filled with a material, such as a lightweight material (e.g., aerogel, etc.). The surface 152 may be at least partially formed from a fiber matrix, such as a nylon, a carbon, and/or a para-aramid synthetic (e.g., Kevlar) fiber matrix, with a foam section 154, such as closed cell polyurethane foam, used for infrasonic wind screening.

Figure 2A:
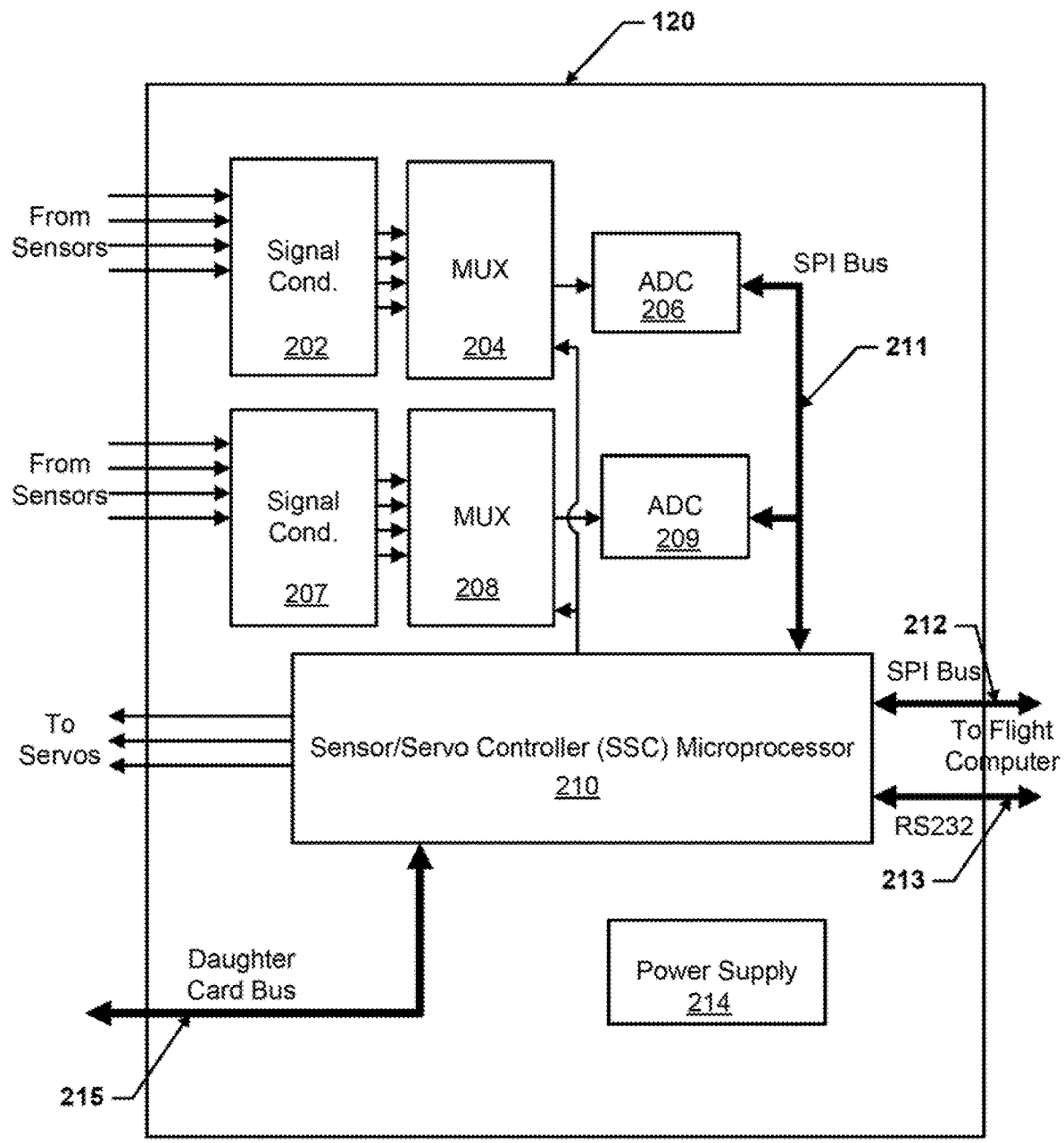
FIG. 2A is a component block diagram of an embodiment avionics controller module (ACM) suitable for use with the UAV of FIG. 1A.

FIG. 2A is a component block diagram of an embodiment avionics controller module, ACM 120, suitable for use with an embodiment monitoring device, such as the UAV 100. With reference to FIGS. 1A-2A, in various embodiments, the ACM 120 may be a small low power electronics board which may be used as a single board or it can be partitioned and installed at different locations of the wing 105 and fuselage 101. The ACM 120 may be connected to an in communication with the UAV 100's one or more flight computers 126 and used with the flight computers 126 to control the operations of the UAV 100. The ACM 120 may serve as both a hardware and a software partition between any flight computers 126 and the sensor suites 116 and 118, as well as between the servo motors required to control the UAV 100. Using the ACM 120, the flight computers 126 may be freed from the software complexity and timing constraints normally associated with handling the sensors and servo motors on UAVs. In various embodiments, the flight computers 126 may communicate with the ACM 120 using a simple general-purpose interface that enables the flight computers 126 to access the UAV 100's sensor data, and to control the position of the UAV's servo motors.

In various embodiments, the ACM 120 may include a first signal conditioning component 202, such as an amplifier, band-pass filter, etc., that may receive data signals from various ones of the sensors of the sensor suites 116 and/or 118. In various embodiments, the first signal conditioning component 202 may be a sensor card configured such that the input voltage may be different for each sensor sending outputs to the ACM 120. For example, the signal conditioning component 202 may have different resistor values for each sensor. The signal conditioning component 202 may have different sampling rates for each sensor. For example, the flight computer control 126 may control the sampling rate and the signal conditioning component 202 may be configured to request data from specific sensors on each sample. The fast sample rate sensors may be requested more often than the slow sample rate sensors. The conditioned signals may be passed from the first signal conditioning component 202 to a first multiplexer 204 and the multiplexed signal output from the multiplexer 204 may be passed to a first analog-to-digital converter (ADC) 206. The ACM 120 may also include a second signal conditioning component 207, such as an amplifier, band-pass filter, etc., that may receive data signals from various ones of the sensors of the sensor suites 116 and/or 118. The conditioned signals may be passed from the second signal conditioning component 207 to a second multiplexer 208 and the multiplexed signal output from the multiplexer 208 may be passed to a second ADC 209. The digital output of the first ADC 206 and the second ADC 209 may be sent to the sensor/servo controller (SSC) microprocessor 210 via a serial peripheral (SPI) bus 211. In various embodiments, the first multiplexer 204 and second multiplexer 208 may also be connected to the SSC microprocessor 210 which may control the operation of the multiplexers 204, 208 and ADCs 206, 209. In various embodiments, the multiplexers 204, 208 may be analog multiplexers. Each input to the multiplexers 204, 208 may be successively selected by the SSC microprocessor 210 and passed to the ADCs 206, 209 which may be 16-bit ADCs. After the ADCs 206, 209 converts the analog sensor input, the SSC microprocessor 210 may read the ADC outputs using the SPI bus 211 and store the resulting digital values. The digital sensor data may then be sent to the flight computers 126 as needed. A recommended standard (RS) 232 universal asynchronous receiver-transmitter (UART) interface between the ADCs 206, 209 and SSC microprocessor 210 may also be provided to facilitate debug and configuration. Additionally, or alternatively, a Universal Serial Bus (USB) interface between the ADCs 206, 209 and SSC microprocessor 210 may also be provided. For higher speed applications, either USB or SPI may be used.

In various embodiments, the SSC microprocessor 210 may control ACM 120 operation. The ACM 120 may collect data from sensors, such as from 16 sensors split 8 to each signal conditioning component 202, 207, and via the SSC microprocessor 210 may drive a minimum of six control signals (PWM, S-Bus, PPM, etc . . . ) for adjusting the UAV 100 actuators 114 and other servo motors. In various embodiments, the pulse width can be adjusted to within a few microseconds. The SSC microprocessor 210 may be configured to read a complete set of data from all sensors and update speed and/or control surfaces (e.g., servo motors, speed controllers, motor controllers, etc.) connected to it at a rate of 200 times a second (200 Hz). To update the position of a servo motor, the flight computers 126 may send servo motor selection and position information to the SSC microprocessor 210 and the SSC microprocessor 210 may convert position information to the required pulse width for the selected servo motor. In various embodiments, the flight computers 126 may provide timing signals to the SSC microprocessor 210 and request data as needed. In various embodiments, the flight computers 126 may communicate with the SSC microprocessor 210 using either a high-speed SPI bus 212 or a RS 232 UART interface 213. Additionally, a USB interface may connect the SSC microprocessor 210 to the flight computers 126. From the SSC microprocessor 210 the flight computers 126 can, as needed, read the current sensor data and write values to update servo motor positions.

In various embodiments, the capability of the ACM 120 may be enhanced by adding an optional daughter card (i.e., another ACM 120) to expand the capability and add features as needed, such as reading motor revolutions per minute (RPM) via additional sensors. Daughter cards (i.e., additional ACM 120s) may be connected to a daughter card bus 215 and may enable additional sensors output to be received and provided to the SSC microprocessor 210. Additionally, the SSC microprocessor 210 may read and/or generate Stüve diagrams and transmit data in real time. These and other capabilities may be built into the SSC microprocessor 210 and/or may be implemented by daughter cards (i.e., other ACM 120s) may be connected to the daughter card bus 215. In some embodiments, the ACM 120 may be sized to fit within 10×12 in$^2$. In some embodiments, the ACM 120 may require less than 0.1 watts of power provided by a power 214 supply on the board. Power required for sensors and servo motors of the UAV may be separate from the power supply 214.

One of the advantages of the ACM 120 may be that using the ACM 120 the flight computers 126 can be implemented using any number of unmodified inexpensive commercial off-the-shelf computers. The Raspberry Pi, Beaglebone Blue, or any other computer capable of controlling flight may be example off-the-shelf computers that can be used for the flight computers 126. This option may offload from the flight computers 126 (e.g., Raspberry Pis) the low-level functions required to collect sensor data and/or control the servo motors. A serial interface to the ACM 120 may require minimum input/output (I/O) resources on the flight computers 126. This may also relax timing constraints on the flight computers 126 and significantly simplify the sensor and servo motor software requirements. If for whatever reasons the processor used for the flight computers 126 may be changed, no changes may be needed to the ACM 120. In various embodiments, the ACM 120 may not be configured to implement flight control algorithms. Flight control algorithms may be the function of the flight computers 126. The purpose of the ACM 120 may be to collect sensor data for use by the flight computers 126 and to update PWM signals for the flight servo motors as directed by the flight computers 126. In this manner, the ACM 120 may control the speed and/or control surfaces (e.g., speed controllers, motor controllers, servo motors, etc.) based on messages or other inputs received from the flight computers 126. The ACM 120 may simplify both flight computers 126 hardware and software. Thus, using the ACM 120, flight computer 126 development time may be reduced. This is because the flight computers 126 no longer have to be concerned with the complexity and critical timing constraints normally associated with handling sensors and servo motors on the UAV 100.

In some embodiments, the ACM 120 may be configured to handle up to sixteen sensors and control a minimum of six speed and/or control surfaces (e.g., servo motors, speed controllers, motor controllers, etc.). More or less sensors and/or servo motors may be connected to and controlled by the ACM 120 and/or connected daughter cards (i.e., additional ACMs 120).

In some embodiments, the SSC microprocessor 210 may be configured to generate Stüve diagrams based on received sensor data. These parameters can be fed into SSC microprocessor 210 for plotting Stüve diagrams to determine weather parameters. In Stüve diagrams, the plot also represents the saturation mixing ratio (amount of water vapor which would need to be present in a parcel of air in order for the air to be "saturated" to produce a cloud, or fog, or rain). If the air parcel's pressure and-temperature is measured, then the saturation mixing ratio can be read directly from the Stüve diagram. Additionally, the SSC microprocessor 210 may be configured to calculate dew point when the temperature and relative humidity is determined. Relative humidity gives the ratio of how much moisture the air is holding to how much moisture it could hold at a given temperature. Additionally, an infrasonic microphone can be used to determine wind shear to track tornadoes, severe weather, and hurricanes. Wind shear information may be added to the Stüve diagrams by using the infrasonic data.

Figure 2B:
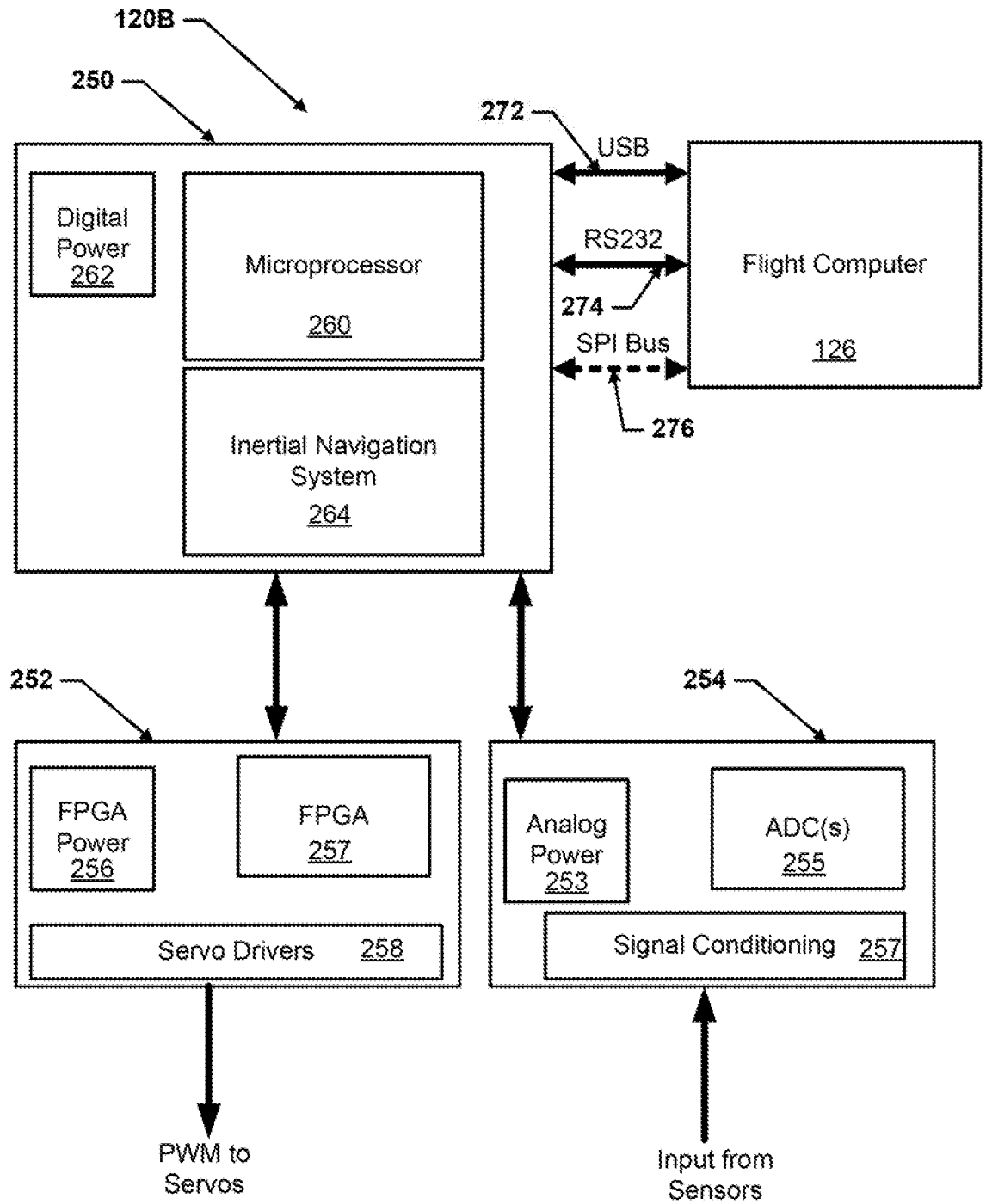
FIG. 2B is a component block diagram of another embodiment ACM suitable for use with the UAV of FIG. 1A.

FIG. 2B is another component block diagram of an embodiment avionics ACM 120B suitable for use with an embodiment monitoring device, such as the UAV 100. With reference to FIGS. 1A-2B, the ACM 120B may operate in a similar manner as ACM 120 described above with reference to FIGS. 1A-2A, but may present a different configuration of boards and circuit elements than described above. For example, the ACM 120B may include a main board 250, a servo daughter card 252, and a sensor daughter card 254 all connected together. The servo daughter card 252 may be Field-Programmable Gate Array (FPGA) based. The FPGA 257 of the servo daughter card 252 may be under control of the ACM 120B main board 250 and may generate the pulse width modulation (PWM) to the servos. The FPGA 257 may interface with the servo drivers 258 and the servo daughter card 252 may be powered by its own FPGA power source 256. The FPGA 257 may drive application interfaces, such as PWM, S-Bus, PPM, CPPM, motor control, and other flight control communication protocols. The flight computer 126 may provide the timing signals to request data as needed. The sensor daughter card 254 may include ADC(s) 255 and signal conditioning component(s) 257 powered by an analog power source 253. The ADC(s) 255 may be similar to ADCs 206, 209 described above, and the signal conditioning components(s) 257 may be similar to signal conditioning components 202, 207 described above. The main board 250 may include a microprocessor 260 and inertial navigation system 264 and a digital power source 262. The microprocessor 260 may be similar to SSC microprocessor 210 described above. The main board 250 may connect to the flight computer 126 via one or more connections and interfaces, such as USB interface 272, RS232 interface 274, and/or optional SPI bus interface 276. The RS232 interface 274 may be provided to facilitate debug and configuration. USB interface 272 and/or optional SPI bus interface 276 may be used for higher speed applications.

A fundamental difficulty in the detection/recording of outdoor and high altitude weather-related parameters is counteracting the "wind noise". There are certain parameters where effective wind screening is vital to the success of outdoor measurements. One such parameter is "wind shear". Wind shear is a source of infrasound and tracking infrasound from wind shear phenomenon requires wind-screening of infrasonic sensors. An infrasonic sensor installed on the UAV 100 is useful to measure weather related parameters including wind shear measurement. However, the infrasonic sensor requires wind-screening. This wind-screening may be achieved in various embodiments UAVs, such as UAV 100 in different manners.

In one embodiment, the complete UAV 100 may be made of closed-cell polyurethane foam. In another embodiment, a compartment for infrasonic sensors may be constructed in the UAV 100 and may be covered with closed-cell polyurethane foam.

Figure 3:
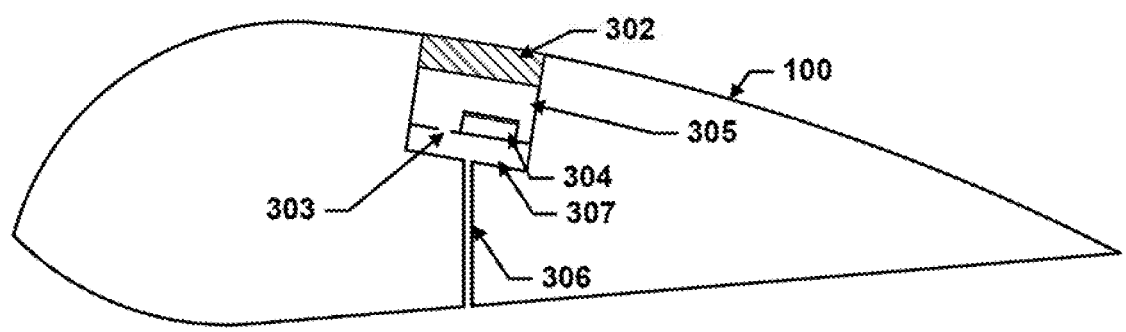
FIG. 3 illustrates an embodiment infrasonic sensor arrangement suitable for use in an embodiment high altitude UAV.

As illustrated in FIG. 3, wind-screening may be achieved in an embodiment using closed-cell polyurethane foam 302, two back chambers 305, 307, and equalization ports 303 and 306. With reference to FIGS. 1A-3, the closed-cell polyurethane foam 302 may act as a wind-screen for the infrasonic microphone 304. The back chambers 305 and 307 may surround the infrasonic microphone 304. The first back chamber 305 may be connected to the second back chamber 307 by a first equalization port 303. The second back chamber 307 may be connected to equalization port 306 which is vented to the atmospheric environment. An infrasonic microphone 304 may be installed in the first back chamber 305, the second back chamber 307, or in both chambers 305, 307. The vents 303 and 306 may be 0.5 mm to 2 mm vents in various embodiments. While FIG. 3 illustrates two back chambers 305 and 307, in various embodiments more than two back chambers may be used.

Figure 4:
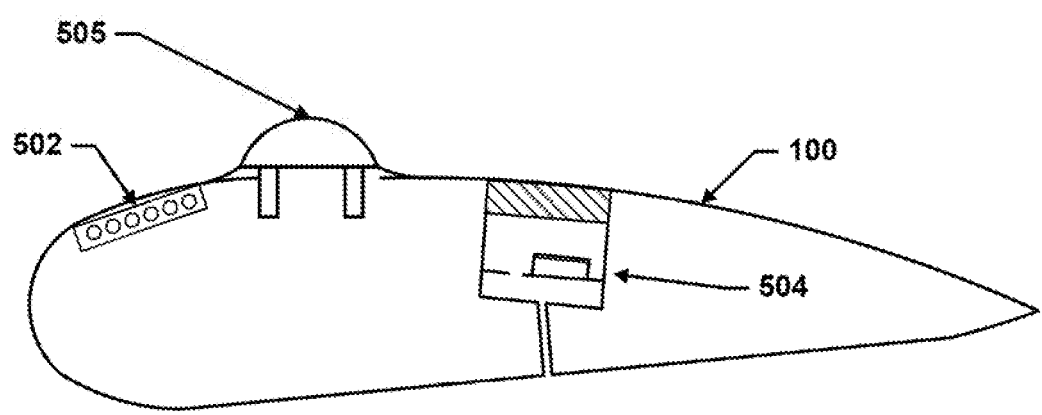
FIG. 4 illustrates an embodiment infrasonic sensor and ultrasonic sensor arrangement suitable for use in an embodiment high altitude UAV.

FIG. 4 illustrates an embodiment weather station that may be included in a monitoring device, such as the UAV 100. Specifically, FIG. 4 illustrates an embodiment weather station including an infrasonic sensor 504, ultrasonic sensor 505, and suite of other sensors 502 arranged on the UAV 100. With reference to FIGS. 1A-4, the infrasonic sensor 504 may be part of the sensor suite 116, the ultrasonic sensor 505 may be part of the sensor suite 118 along with the suite of other sensors 502. The suite of other sensors 502 may include one or more barometric pressure sensors, one or more altitude sensors, one or more temperature sensors, one or more relative humidity sensors, one or more wind speed sensors, one or more wind direction sensors, and/or one or more wind shear sensors. Ultrasonic sensor 505 may be configured to measure weather related parameters, and may be any type ultrasonic sensor, including a barometric pressure sensor, altitude sensor, temperature sensor, relative humidity sensor, wind speed sensor, wind direction sensor, and wind shear sensor. The weather station may include the ultrasonic sensor 505 encased in closed-cell polyurethane foam for wind-screening and covered with an elliptical dome acting as an aerodynamic cap. The elliptical dome may be formed of a fiber matrix or closed cell polyurethane foam and the elliptical dome may encase and cover the ultrasonic sensor 505. An equalization port using pito-tube or a separate tube may also be provided. The arrangement of the infrasonic sensor 504 may be similar to the arrangement illustrated in FIG. 3.

Figure 5:
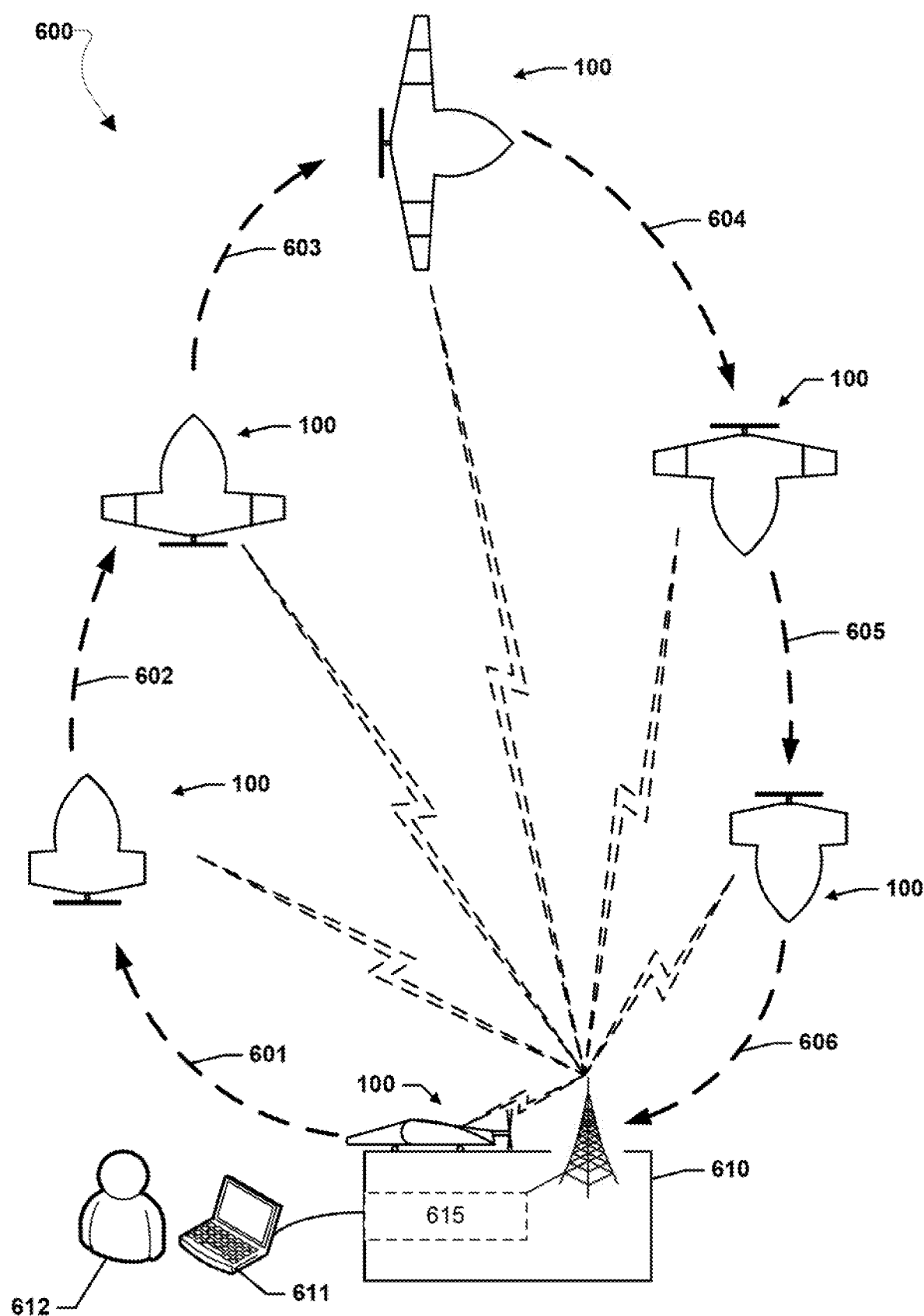
FIG. 5 is a system block diagram of an embodiment airborne system for measuring meteorological parameters.

FIG. 5 is a system block diagram of an embodiment system for measuring meteorological parameters, specifically an airborne system 600 for measuring meteorological parameters. With reference to FIGS. 1A-5, the airborne system 600 may include UAV 100 and a base/control station 610. The base/control station 610 may include a processor 615 connected to an antenna and other communication hardware (e.g., modem, transceiver, etc.) for establishing wireless data links to the UAV 100. A user 612 of the airborne system 600 may use his or her computing device 611 connected (wired and/or wirelessly) to the base/control station 610 to exchange data with the base/control station 610 and/or UAV 100. Via the connections to the base/control station 610 and UAV 100, the user 612 may visualize weather data on his or her computing device 611 based on sensor measurements by the UAV 100 including high altitude infrasonic measurements.

The airborne system 600 may leverage infrasonic sensors on the UAV 100 to measure and track various meteorological parameters and events, such as wind shear, seismic waves, magnetic storms, magnetohydrodynamic waves, severe weather, tornadoes, hurricanes, meteors, and lighting. The airborne system 600 may be a meteorological system that can provide meteorological parameters at any location at any desired time. Via flights of the UAV 100, the system 600 may scan local and regional areas from ground to high altitude each hour or as needed. The system 600 may measure accurately all key ingredients/parameters that contribute to producing severe storms (including severe thunderstorms, tornadoes, and microbursts).

In operation, the UAV 100 may fly up from the base/control station 610 that may be located on the ground. In a first phase 601 of flight the UAV 100 may climb to a first altitude with its wings 105 fully retracted. The UAV 100 may use its suites of sensors 116, 118 to gather meteorological data as it flies. As the UAV 100 crosses a first altitude threshold or level it may transition to a second phase 602 of flight in which the wings 105 may be semi-extended. The UAV 100 may use its suites of sensors 116, 118 to gather meteorological data as it flies in the second phase 602. As the UAV 100 crosses a second altitude threshold or level it may transition to a third phase 603 of flight in which the wings 105 may be fully-extended. The UAV 100 may use its suites of sensors 116, 118 to gather meteorological data as it flies in the third phase 603. The third phase 603 may be a high altitude phase and the UAV 100 may measure and track various parameters and events in the third phase 603, such as wind shear, seismic waves, magnetic storms, magnetohydrodynamic waves, severe weather, tornadoes, hurricanes, meteors, and lighting.

In a fourth phase 604 of flight the UAV 100 may dive down to the second altitude and upon crossing under the second altitude threshold or level may retract its wings 105 to the semi-extended configuration. The UAV 100 may use its suites of sensors 116, 118 to gather meteorological data as it flies. In a fifth phase 605 of flight, the UAV 100 may fly down and cross the first altitude threshold or level and transition its wings 105 to the fully retracted configuration. The UAV 100 may use its suites of sensors 116, 118 to gather meteorological data as it flies in the fifth phase 605. Finally, the UAV 100 may fly to the base/control station 610 in a sixth phase 606 and may land on the base/control station 610. In various embodiments, the UAV 100 may be configured to fly from and return to the base/control station 610 within an hour or sooner (i.e., complete all phases 601, 602, 603, 604, 605, and 606 of flight in an hour or less).

During all phases 601, 602, 603, 604, 605, and 606 of flight and while docked on the base/control station 610, the UAV 100 may exchange data with the base/control station 610 via wireless data links established with the base/control station 610. In this manner, the meteorological data gathered by the UAV 100 may be sent to the base/control station 610 in real-time, and the user 612 may receive the meteorological data at his or her connected computing device 611 from the base/control station in real-time. For example, the UAV 100 may send Stüve diagrams or other weather-related information to the base/control station 610 and connected computing device 611 and/or the UAV 100 may send data related to measured and tracked meteorological parameters and events, such as wind shear, seismic waves, magnetic storms, magnetohydrodynamic waves, severe weather, tornadoes, hurricanes, meteors, and lighting, to the base/control station 610 and connected computing device 611.

Figure 6:
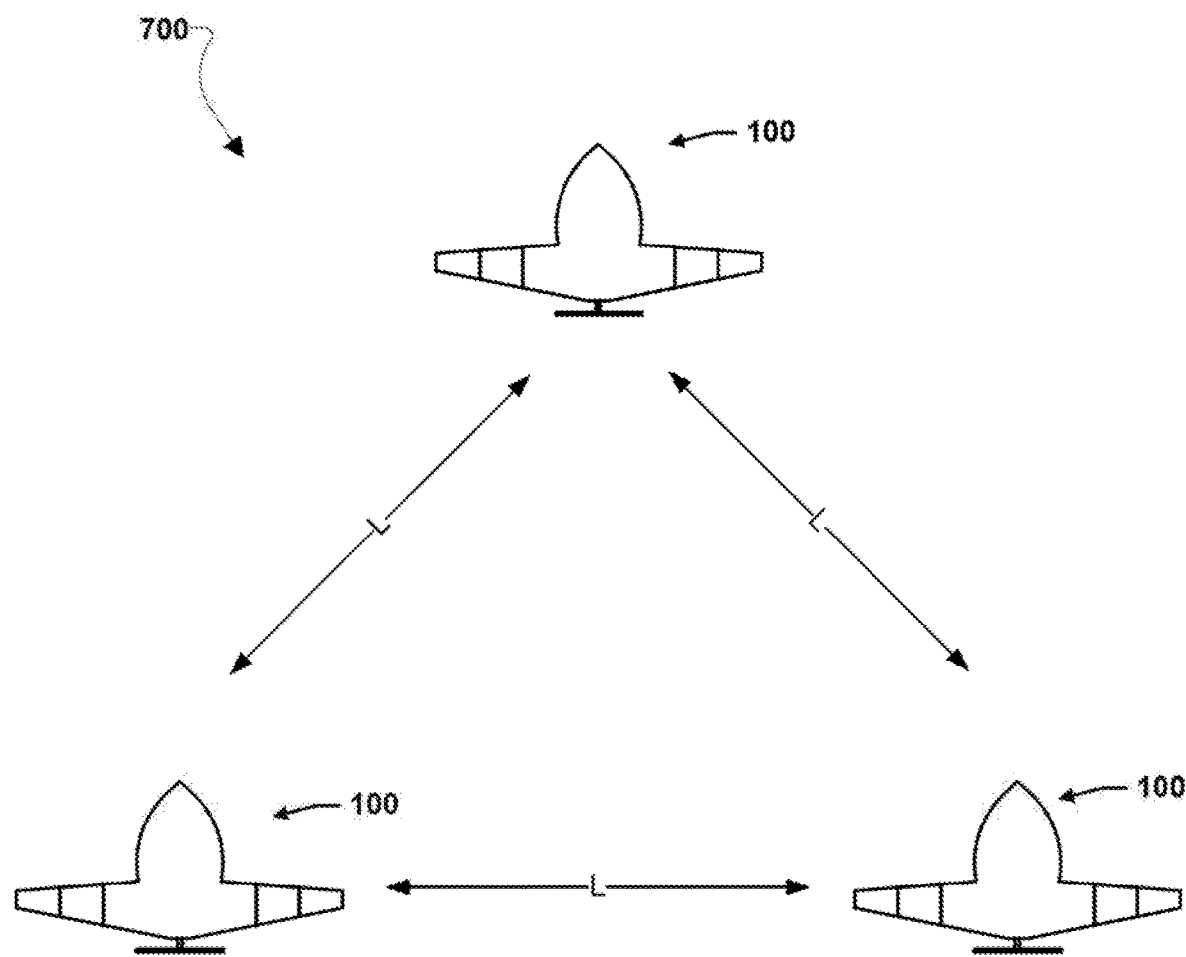
FIG. 6 is a system block diagram of an embodiment airborne system including three UAVs for measuring meteorological parameters.

FIG. 6 is a system block diagram of an embodiment system including three monitoring devices working in tandem for measuring meteorological parameters, such as an airborne system 700 including three UAVs 100 working in tandem for measuring meteorological parameters. With reference to FIGS. 1A-6, the UAVs 100 may be sent aloft in a manner similar to that described with reference to FIG. 5. As there may be multiple UAVs 100, such as three UAVs 100, the UAVs 100 may be used to detect sources of infrasonic sound. In various embodiments, the UAVs 100 may be in communication with one another and/or may communicate with the base/control station 610. For example, the UAVs 100 may send measurement data to one another and/or the base/control station 610. The UAVs 100 may fly in an equally-spaced formation with each UAV 100 being a distance "L" for the other two UAVs 100. To determine direction and altitude of any infrasonic source, an array of three infrasonic microphones may be required as may be provided on board the three UAVs 100. The method for determining direction and altitude may include identifying, via on-board data acquisition system (DAS), a level of coherence of the detected infrasonic acoustic signals from each possible pair of microphones and recognizing the infrasound source using the coherence and a time history of the detected signals. The method for determining direction and altitude may include estimating source properties via the DAS, including a magnitude, azimuth angle, and elevation angle, and executing a control action in response to the estimated properties. In various embodiments, a processor, such as the DAS, of a first UAV 100 may be configured to receive data from the second UAV 100 and the third UAV 100 and use the data its own infrasonic sensors with the data from other two UAVs 100 to determine a direction and altitude of an infrasonic source.

While discussed herein as various infrasonic, ultrasonic, and other type sensors being carried in UAVs, the various embodiments may be applicable to other type vehicles and/or monitoring devices, such as robots, rovers, and unmanned underwater vehicles. As such the discussion of UAVs may be merely an example, the various installation and measurement methods and various infrasonic, ultrasonic, and other type sensors discussed herein may be applied to other type vehicles and/or monitoring devices, such as robots, rovers, and unmanned underwater vehicles, without departing from the spirit or scope of the invention. Additionally, the various infrasonic, ultrasonic, and other type sensors and various installation and measurement methods described herein may be applied to other form factors of monitoring devices beyond vehicles, such as ground applications in which such sensors may be carried in a backpack or other human portable device. As such the discussion of various types of vehicles, UAV or otherwise, herein are provided merely as examples, and the various infrasonic, ultrasonic, and other type sensors and various installation and measurement methods described herein may be applied to other form factors of monitoring devices beyond vehicles, such as ground applications in which such sensors may be carried in a backpack or other human portable device, without departing from the spirit or scope of the invention. As examples, a soldier in a war zone area may carry monitoring devices of embodiment systems in a backpack, and data from three soldiers carrying such embodiment backpacks may be combined to determine direction and location of artillery firing at a given time. As the systems and monitoring devices of the various embodiments may be vehicle mounted, human portable, and/or combinations of various other form factors, various ones of the above described elements, such as flight computer 126, power plant 110, actuators 114, ACM 120, ACM 120B, etc., may be optional and/or substituted for appropriate type computers, power plants, actuators, and control modules as appropriate to the form factor. For example, flight computer 126 and ACM 120 may be substituted for a drivetrain computer and drivetrain control module in a rover. As another example, actuators 114 and flight computer 126 may not be needed in a backpack carried monitoring device. Various modifications to the above described elements, such as flight computer 126, power plant 110, actuators 114, ACM 120, ACM 120B, etc., will be readily apparent to those skilled in the art and may be applied to other embodiments without departing from the spirit or scope of the invention.

The processors described herein, such as SSC microprocessor 210, processor 615, etc., may be any programmable microprocessor, microcomputer or multiple processor chip or chips that can be configured by software instructions (applications) to perform a variety of functions, including the functions of the various embodiments described above. In some embodiments, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An unmanned aerial vehicle (UAV), comprising:
a fuselage;
a wing formed at least partially of a fiber matrix filled with aerogel;
one or more infrasonic sensors disposed at least partially within the wing; and
a microprocessor connected to the one or more infrasonic sensors, wherein the microprocessor is configured to receive data from the one or more infrasonic sensors to measure meteorological parameters.

2. An unmanned aerial vehicle (UAV), comprising:
a fuselage;
an extendable wing configured to extend and retract relative to the fuselage at different altitude levels;
one or more infrasonic sensors; and
a microprocessor connected to the one or more infrasonic sensors, wherein the microprocessor is configured to receive data from the one or more infrasonic sensors to measure meteorological parameters.

3. The UAV of claim 2, wherein the UAV is formed at least partially of closed-cell polyurethane foam.

4. The UAV of claim 2, wherein the one or more infrasonic sensors are wind-screened at least in part by closed-cell polyurethane foam.

5. The UAV of claim 4, wherein the one or more infrasonic sensor is disposed in one or more back chambers connected to an equalization port.

6. The UAV of claim 2, wherein the UAV is formed at least partially of a fiber matrix of one or more of nylon, carbon, and a para-aramid synthetic fiber and wherein the fiber matrix is filled with aerogel.

7. The UAV of claim 2, further comprising one or more ultrasonic sensor encased with an elliptical dome formed of a fiber matrix or closed cell polyurethane foam.

8. The UAV of claim 7, further comprising one or more of a barometric pressure sensor, an altitude sensor, a temperature sensor, a relative humidity sensor, a wind speed sensor, a wind direction sensor, and a wind shear sensor.

9. The UAV of claim 2, further comprising a flight computer connected to the microprocessor, wherein the microprocessor does not implement flight control algorithms.

10. The UAV of claim 9, further comprising one or more servo motor connected to the microprocessor, wherein the microcontroller controls the one or more servo motor based at least in part on messages received from the flight computer.

11. The UAV of claim 9, further comprising a transceiver connected to the microprocessor, wherein the transceiver is configured to establish a wireless data link with a base/control station to send data related to the measured meteorological parameters to the base/control station.

12. The UAV of claim 11, wherein the microprocessor is configured to measure the meteorological parameters at least in part using Stüve diagrams.

13. The UAV of claim 12, wherein the measured meteorological parameters are one or more of wind shear, seismic waves, magnetic storms, magnetohydrodynamic waves, severe weather, tornadoes, hurricanes, meteors, and lighting.

14. A system, comprising:
a base/control station, comprising:
a first transceiver; and
a monitoring device, comprising:
one or more infrasonic sensors;
a microprocessor connected to the one or more infrasonic sensors, wherein the microprocessor is configured to receive data from the one or more infrasonic sensors to measure meteorological parameters; and
a second transceiver connected to the microprocessor, wherein the second transceiver is configured to establish a wireless data link with the first transceiver of the base/control station to send data related to the measured meteorological parameters to the base/control station.

15. The system of claim 14, wherein the monitoring device is an unmanned aerial vehicle (UAV), comprising:
a fuselage; and
an extendable wing configured to extend and retract relative to the fuselage at different altitude levels.

16. The system of claim 15, wherein the UAV is formed at least partially of closed-cell polyurethane foam.

17. The system of claim 16, wherein the UAV is formed at least partially of a fiber matrix of one or more of nylon, carbon, and a para-aramid synthetic fiber and the fiber matrix is filled with aerogel.

18. The system of claim 16, wherein the measured meteorological parameters are one or more of wind shear, seismic waves, magnetic storms, magnetohydrodynamic waves, severe weather, tornadoes, hurricanes, meteors, and lighting.

19. The system of claim 18, wherein a flight time of the UAV to measure meteorological parameters is one hour or less.

20. The system of claim 14, further comprising:
a second monitoring device; and
a third monitoring device,
wherein the microprocessor is configured to receive data from the second monitoring device and third monitoring device and use the data from the one or more infrasonic sensors with the data from the second monitoring device and third monitoring device to determine a direction and altitude of an infrasonic source.

* * * * *